UNITED STATES PATENT OFFICE.

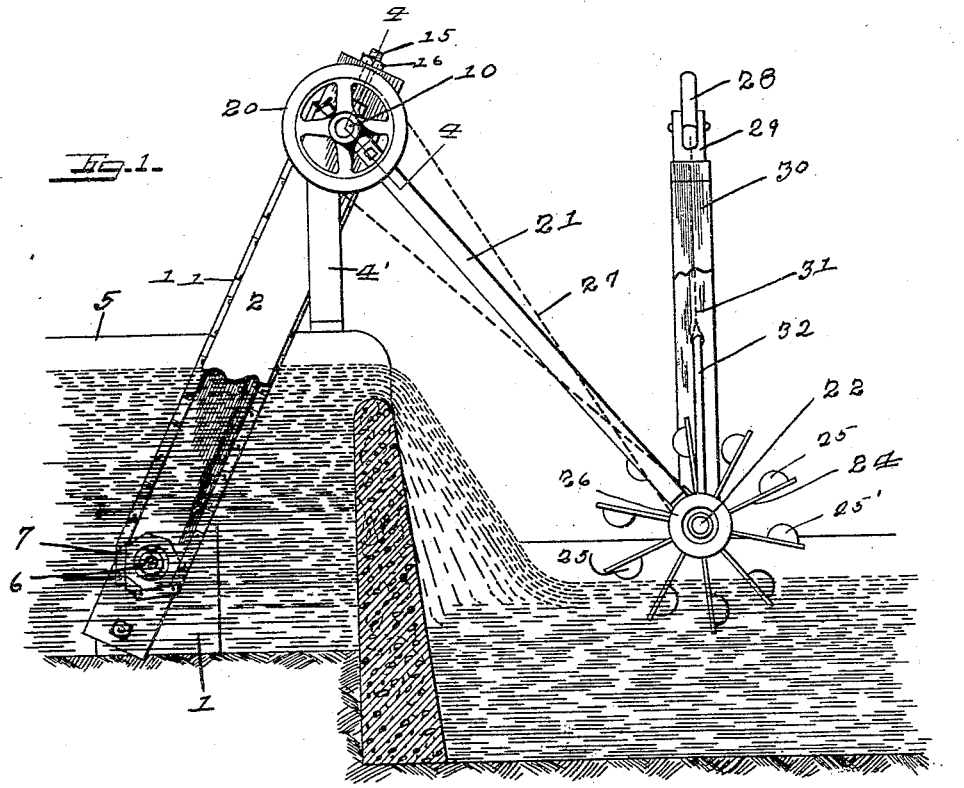

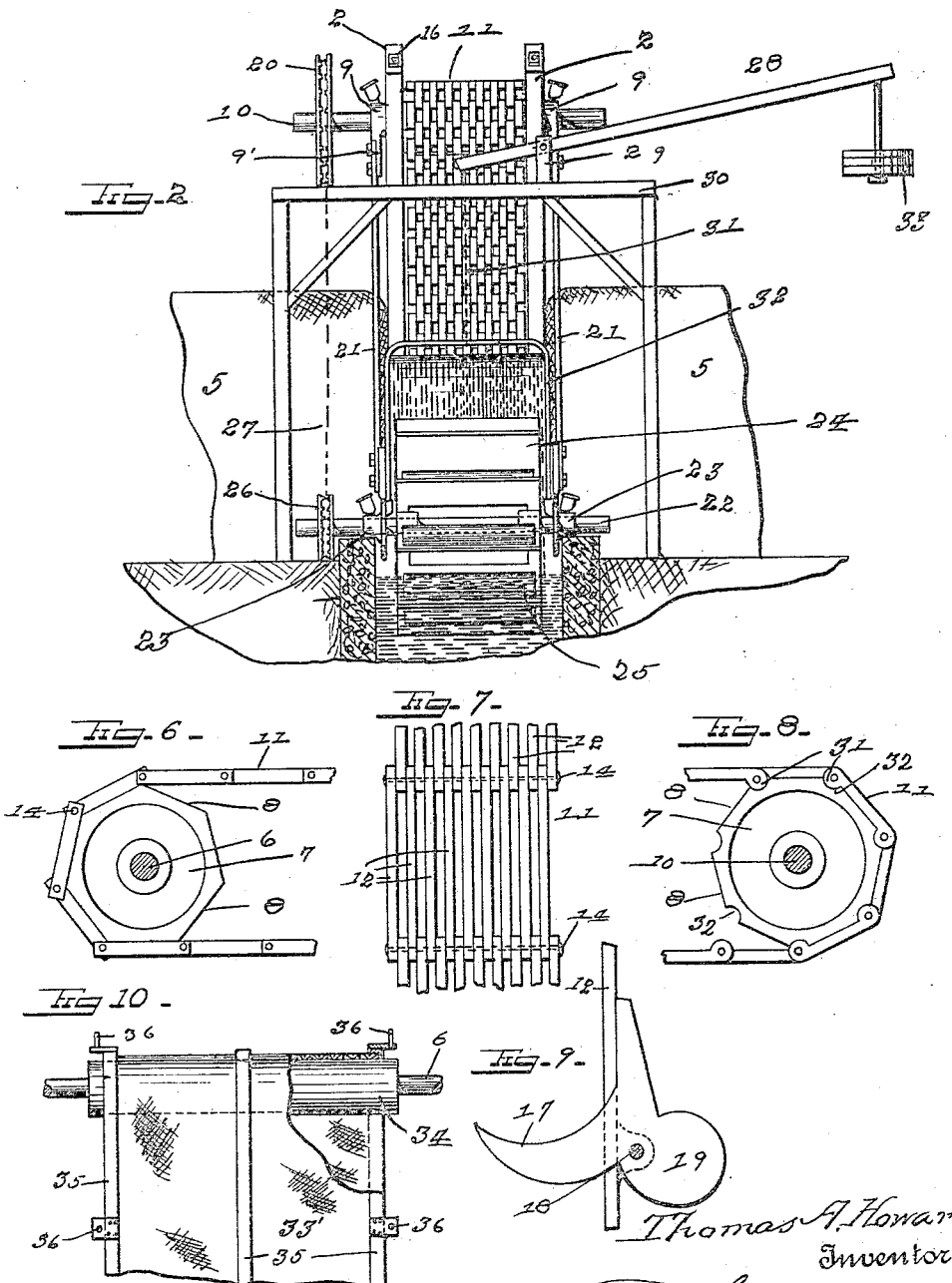

THOMAS A. HOWARD, OF MURRAY, UTAH.

FISH-SCREEN.

1,243,525.   Specification of Letters Patent.   Patented Oct. 16, 1917.

Application filed December 2, 1916. Serial No. 134,624.

*To all whom it may concern:*

Be it known that I, THOMAS A. HOWARD, a citizen of the United States, residing at Murray, in the county of Salt Lake and State of Utah, have invented certain new and useful Improvements in Fish-Screens, of which the following is a specification.

My invention relates to improvements in fish screens and is an improvement over the one described in Letters Patent Number 992,563, issued to me May 16th, 1911.

The primary object of my invention is the provision of a fish screen adapted to be placed in a stream, canal or other waterway which will prevent the passage of fish therethrough while assisting in the removing of the debris in the stream and preventing the collection thereof.

A further object of my invention is the provision of a screen of this character especially adapted for use at dams or gates which will prevent the fish in the stream from passing therethrough and which will prevent the collecting of debris against either the screen or the foot of the dam or gate, but will cause said debris to pass over the obstruction and pass on down the stream.

With the above and other objects in view which will appear as the description proceeds the invention consists in the novel construction, combination and arrangement of parts, hereinafter described and claimed, it being understood that changes in the precise embodiment of the invention herein disclosed can be made without departing from the spirit of the invention.

In the accompanying drawings I have illustrated one complete example of the physical embodiment of my invention constructed according to the best mode I have so far devised for the practical application of the principles of my invention.

Figure 1 represents a side elevation of my complete screen and mechanism for operating the same shown in position for use.

Fig. 2 represents a front elevation of my invention.

Fig. 3 represents a central sectional view through the water or paddle wheel.

Fig. 4 represents a sectional view taken on line 4—4 of Fig. 1.

Fig. 5 represents a detailed view showing the manner of bracing the side members.

Fig. 6 represents a side elevation of one of the screen rollers with a portion of the screen thereon.

Fig. 7 represents a top plan view of a portion of the screen.

Fig. 8 represents a view similar to Fig. 6 of a modified form of screen and roller.

Fig. 9 represents a side elevation of a debris engaging hook which may be utilized to assist the screen in removing the debris, and Fig. 10 represents a top plan view of a further modified form of screen, the screen being partly broken away to show the roller used therewith.

In the drawings, the numeral 1 designates the bottom or anchor of the supporting frame, said anchor being located at the bottom of the waterway and having the side members 2 rising therefrom and connected near their upper ends by a cross-bar 3 and strengthened by the braces 4, lateral braces 4′ extending from the members 2 to the banks 5 of the waterway to secure said frame in position. Journaled in the base of the members 2 is the shaft 6 bearing the roller 7 formed with the flat faces or surfaces 8, while journaled in the bearings or boxes 9 is a shaft 10 bearing a roller similar to roller 7, a linked screen or endless belt 11, passing around the rollers 7, said linked screen or endless belt being formed by the series of links or bars 12 pivoted at their ends by the pins or studs 14, the bars 12 engaging the flat faces or surfaces 8 of the rollers 7.

The bearing boxes 9 have pivotally secured thereto for adjusting the relative distance between the shafts 6 and 10, the threaded eye-bolt or stud 15 which passes up through the side members 2 and has thereon the threaded nuts 16, the screwing or unscrewing of the nuts 16, tightening or loosening the screen, respectively, as will be apparent.

To assist the screen in removing the debris, I provide the hook 17 which is pivotally secured to the screen at 18, said hook having the enlarged end 19 to cause the hook to close at the bottom of the frame and as it starts its upward course, to open and engage the debris.

Carried by the shaft 10 on one end is a large chain sheave 20, for revolving said shaft through the medium of suitable driving means hereinafter described, and as said shaft is revolved, the rollers are rotated and the screen carried thereby passes over the top of the main frame and down the reverse or downstream side thereof.

The bearing boxes 9 are formed with the ear or lug 9' to which are secured the upper ends of the side bars or members 21, said members extending downward and having the shaft 22 journaled in the bearings 23 secured to the lower ends thereof, said shaft bearing a water or paddle wheel 24 having formed or secured on each paddle thereof a float or air chamber 25, serving to support the lower ends of the water wheel 24 at the proper and correct height above the water to insure the most efficient operation thereof, the wheel rising and lowering with the water and being at all times at the same relative position to the water without reference to the depth thereof, the side members 21 swinging on the shaft 10 as a pivot.

Mounted on one end of the shaft 22 is the small chain sheave 26 which is connected with the larger chain sheave 20 by a chain 27, said chain being crossed in order to move or revolve the rollers 7 in the proper direction.

In order that the water wheel may be lifted out of the water to make the device inoperative, I provide the weighted lever 28 which acts as a fulcrum and is pivoted in the fork 29 carried by a rectangular frame 30 extending over the wheel and to the inner end of the lever 28 is secured the chain or rope 31 which is secured to the bail or yoke 32 having its ends secured to the bearings 23. It will be obvious that the arrangement may be also utilized for varying the speed of the device as allowing the paddles of the wheel 24 to just dip into the water will lessen the speed and also power of the device and the dipping of the paddles farther in the water will give it more power and speed, as will be readily understood, this adjusting being made by the changing of the weights 33 carried by the outer end of the lever 28.

In Fig. 8 I have illustrated a modified form of screen and roller, in which the links are formed with enlargements 31 and the roller with the recesses 32 to receive and engage said enlargements, and in Fig. 10, I have shown a cloth screen 33' revolving on the wooden or metal roller 34, said screen having the leather reinforcing strips 35 and the pins 36 secured thereto for assisting in the removing of the debris. In the modification shown by Fig. 10 it will be understood that the rollers 34 are disposed at the top and bottom the same as in the preferred form.

It will be further understood that while I have illustrated my improved linked revolving screen as located at a dam or gate with the screen thereabove and the driving medium therebelow, the entire mechanism may be located at some other point in the water way, and that instead of my specific form of driving means I may employ an overshot wheel located under the fall or any other suitable means for rotating the shaft 10, the form shown being of course the preferred form.

I claim:—

The combination with a main frame rising from the bottom of a waterway, of a continuous revolving screen mounted therein, a supplemental frame supported from the main frame, a paddle wheel mounted in the lower end of said supplemental frame, float means mounted on the outer ends of the paddles of the wheel, driving connections between the wheel and screen, and means for making said paddle wheel inoperative, said means consisting of a rectangular frame having a fulcrum mounted thereon and connected to a bail secured to the lower end of the supplemental frame, said fulcrum being capable of lifting the lower end of the supplemental frame carrying with it the paddle wheel.

In testimony whereof I affix my signature in the presence of two witnesses.

THOMAS A. HOWARD

Witnesses:
 W. H. STOUT,
 B. H. STOUT.

Copies of this patent may be obtained for five cents each, by addressing the "Commissioner of Patents, Washington, D. C."